Feb. 18, 1947. W. TRAUPEL Re. 22,844
GAS TURBINE PLANT
Original Filed April 2, 1942
Fig. 1,
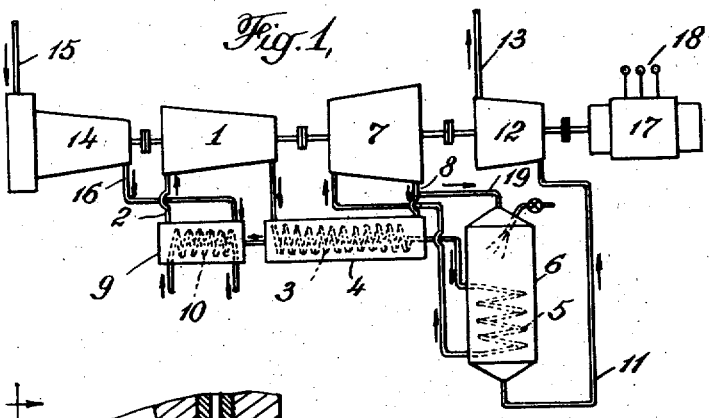
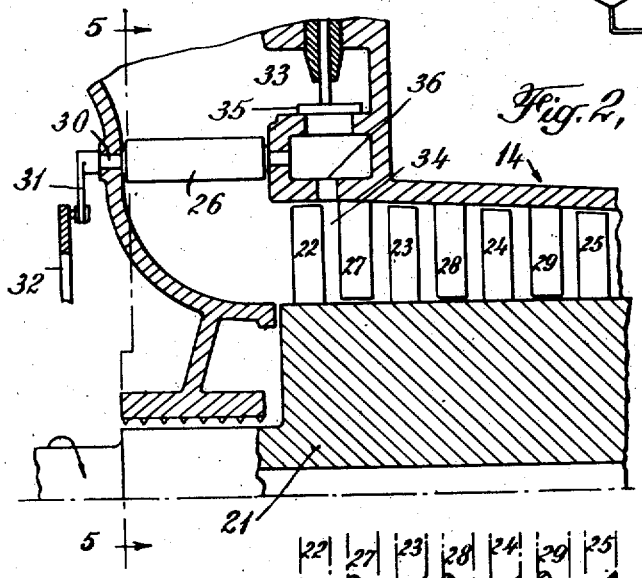
Fig. 2,
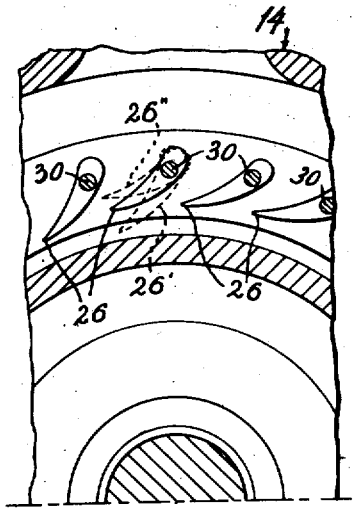
Fig. 5,
Fig. 3,
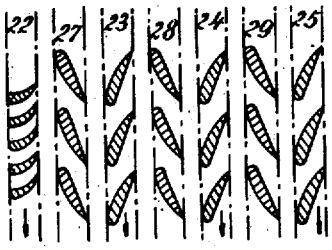
Fig. 4.
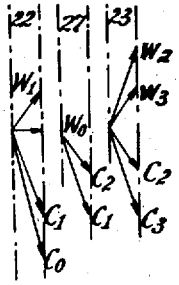
INVENTOR
Walter Traupel
BY
ATTORNEYS Reissued Feb. 18, 1947

Re. 22,844

UNITED STATES PATENT OFFICE 22,844

GAS TURBINE PLANT

Walter Traupel, Winterthur, Switzerland, assignor to Sulzer Freres Societe Anonyme, Winterthur, Switzerland Original No. 2,361,887, dated October 31, 1944, Serial No. 437,341, April 2, 1942. Application for reissue November 19, 1945, Serial No. 629,414. In Switzerland June 27, 1941

7 Claims. (Cl. 60—49)

The invention relates to a gas turbine plant, whose working medium flows in a circuit from which some of the working medium is taken, and to replace it a make-up quantity is introduced. The rotary compressor supplying the make-up quantity of working medium to the circuit can in principle be driven in two different manners, either by a separate machine, or by being coupled to a gas turbine producing the useful output of the plant. If the compressor is driven by a separate machine, for instance by an exhaust gas turbine, this entails the drawback that a balance must be maintained, with the help of regulating devices, between the compressing power required for the working condition of the whole plant and the power of the driving machine, whereby there will be fluctuations in the service in consequence of the inertia of the regulating devices. On the other hand, if the compressor is driven by a turbine producing the useful output, or even if the compressor driven by an exhaust gas turbine is coupled to one of the principal machines to balance the output, this entails the drawback that the speed of the compressor is no longer adjustable and therefore the quantity of make-up working medium must be adjusted by throttling in accordance with the working conditions. This throttling, however, causes a sensible loss of power.

To avoid the drawbacks mentioned above, it is proposed in accordance with the invention to fit the rotary compressor introducing the make-up quantity of working medium into the circuit, with a turbine stage which has adjustable guide wheels—this turbine stage giving power to the rotor and being arranged before the compressor blading—and to couple the compressor to a turbine giving the effective output. In this manner it is possible, when the compressor is coupled direct to a gas turbine developing the useful work, for the work which is set free through regulating the replacement quantity by reducing the pressure before the compressor, to be utilised again in the compressor, instead of being destroyed.

Preferably a mechanical coupling is provided between the compressor supplying the additional quantity of working medium and the turbine producing the effective output, in order to be able to maintain a fixed ratio between the speeds of the two machines.

One example of an execution according to the invention is illustrated in a simplified manner in the drawing. Fig. 1 shows a plan according to the invention; Fig. 2 illustrates a longitudinal section through the compressor of the plant according to the invention delivering the make-up quantity of working material; Fig. 3 shows the arrangement of the blading; Fig. 4 the velocity triangles of the compressor according to Fig. 2, and Fig. 5 is a sectional view along the line 5—5 of Fig. 2.

The compressor 1 delivers working medium which has been drawn in through the pipe 2, this delivery being effected, through the pipe system 3 of a recuperator 4 and the pipe system 5 of a gas heater 6, into the turbine 7. The working medium after expansion passes from the turbine through the pipe 8 into the recuperator 4, in which it heats the pipe system 3; it then passes into the cooler 9, in which it is cooled by the pipe system 10. Through the pipe 2 the working medium is finally again led to the compressor 1 and the circuit begins again.

A part of the working medium is withdrawn from the circuit through pipe 19 and led as combustion air into the combustion space of the gas heater 6. The gases produced in the gas heater flow through the pipe 11 into the exhaust turbine 12, and then through pipe 13 to atmosphere or to other points of use.

To replace the quantity of working medium withdrawn from the circuit through pipe 19, fresh working medium, for instance air, is drawn by the compressor 14 from pipe 15 and introduced in a compressed state through pipe 16 into the cooler 9. The gas turbine 7 and the exhaust turbine 12 are arranged on one common shaft with the compressors 1 and 14 and with the electric generator 17 which gives the useful output of the whole plant to the electric system 18. The shaft runs at a constant speed, corresponding to the periodicity of the electric system 18.

Part of the rotary compressor 14 is shown to a larger scale in Fig. 2. There it can be seen that a turbine stage giving up work to the rotor is arranged before the compressor part and fitted with adjustable guide wheel; it is provided in order to prevent losses when regulating the compressor work or the delivery output. The rotor 21 of the compressor has rows of impeller blades 22—25, of which the row 22 acts as a turbine and the rows 23—25 as compressor. An adjustable row of guide blading 26 is fitted before the turbine blading 22, and a fixed row of guide blading 27—29 before each of the compressor bladings 23—25. Each blade of the row of guide blading 26 is fitted on a shaft 30 which can be adjusted by means of an arm 31 and a rod 32 according to the quantity of air to be compressed.

Between the space 33 before the adjustable guide blading 26 of the turbine stage and the space 34 behind the turbine runner blading 22, a bypass passage 36 is provided, which can be closed by the valve 35, and through this passage the working medium to be compressed can be introduced direct from the space 33 to the first guide blading 27 of the compressor.

For the form of blading shown in Fig. 3 for the impeller blading 22—25 and the guide blading 27—29, the flow velocities in normal service are given in the diagrams in Fig. 4.

$c_0$ represents the absolute inlet velocity in the turbine runner blading 22. The blading is formed in such a way that the outlet velocity $c_1$ from the turbine runner blading 22 is equal to the proper inlet velocity in the successive compressor guide blading 27. The relative inlet and/or outlet velocities $w_0$ and $w_1$ respectively, which determine the form of the turbine blades, correspond to the absolute inlet and outlet velocities $c_0$ and $c_1$.

In the guide blading 27 the inlet velocity $c_1$ is guided round into the outlet velocity $c_2$. With this velocity $c_2$ the working medium enters the runner blading 23. In the runner blading 23 a diversion takes place into the velocity $c_3$ at the outlet from the runner blading 23. The relative velocities $w_2$ and $w_3$ respectively, which are decisive for the blade form and blade adjustment of the compressor runner blading, correspond to the absolute velocities $c_2$ and $c_3$ in the guide blading 23. It can be seen that the working medium issues from the impeller blading 23 directed in the same way and flowing with the same velocity as it entered the guide blading 27. For this reason the profiles are the same in all stages, provided that the height of the blading in the successive stages is shortened in the same proportion as the volume of air is reduced during compression.

When working with normal full-compressing power and with an inlet pressure of, for instance, 1 atm. abs. in the space 33, expansion takes place in the turbine stage to a pressure of about 0.85 atm. abs. For reducing the compressing work, the expansion in the turbine stage can be carried further by reducing the cross-section of flow in the guide blading 26. For increasing the compressing work, the expansion in the turbine stage can be reduced by opening the guide blading 26, so that the expansion in the turbine stage is reduced until finally the pressure in space 34 is approximately the same as in space 33. In the limit case, when the compressing work is at a maximum, the valve 35 is opened, so that the means to be compressed bypass the turbine stage 26, 22 and reach the space 34 direct from space 33 through the passage 36.

The blading (Fig. 3) is shaped in such a way that the best efficiency is obtained at normal load. With the maximum overload this efficiency is reduced only by a slight extent in consequence of the ventilating losses in the turbine wheel, whilst at lower overloads and at part loads there is also a slight fall of the efficiency, since the somewhat altered velocities no longer correspond exactly to the forms of blading.

The invention can of course also be adopted for compressors when the initial pressure is less or greater than 1 atm. abs.

With the invention the advantage is obtained that the quality delivered and the delivery pressure change simultaneously and nearly proportionally to each other with change of load. Hereby, however, the speed can be kept constant. But, in spite of that, the efficiency is very high over a wide range.

I claim:

1. A gas turbine plant which comprises at least one compressor, at least one heater, at least one turbine, at least one cooler, and a recuperator interconnected by conduit means; said conduit means being constructed and arranged to pass cool gas from the cooler to the compressor, compressed gas from the compressor through the recuperator, from the recuperator through the heater and into the turbine, from the turbine through the recuperator into the cooler and back to the compressor; shaft means for driving the compressor by the turbine, a second compressor for passing compressed make-up gas to the cooler to mix with the compressed gas in the circuit, means for driving the second compressor by the turbine, said second compressor having a turbine stage ahead of and on the rotor thereof, a row of adjustable guide blades ahead of the turbine blades to adjust the quantity of gas to be compressed by the second compressor, means to adjust the adjustable guide blades, an exhaust gas turbine, a shaft connecting the exhaust gas turbine to the turbine, and conduit means for passing part of the gas expanded in the turbine through the heater and then through the exhaust gas turbine to the atmosphere, said make-up gas being sufficient to supply the gas discharged from the exhaust gas turbine.

2. A gas turbine plant according to claim 1 which comprises a valve-controlled by-pass means operatively connected to the second compressor for passing air around the adjustable guide blades and turbine runner blades to the impeller blades.

3. A gas turbine plant which comprises a first compressor, a gas heater, a turbine, a cooler, conduit means leading working medium in a circuit through said compressor, said heater, said turbine, said cooler and back into said first compressor, a second compressor arranged to deliver working medium to that circuit to replace fluid discharged from it, coupling devices for transmitting work between said turbine and said compressors, expansion turbine means arranged before said second compressor driven by the working medium supplied thereto, a coupling device for transmitting work between said expansion turbine means and said second compressor, guide blading for said expansion turbine means in the intake thereto having adjustable guide blades, a turbine for delivering useful work outside the plant, conduit means for delivering the fluid discharged from the circuit to the combustion chamber of the gas heater, conduit means for conducting the combustion gases of the gas heater to the turbine delivering useful work, and means for discharging said combustion gas to the atmosphere after expansion in the turbine.

4. A plant according to claim 3 in which the coupling devices for transmitting work between the first turbine and the compressors consist of direct drive shaft couplings.

5. A plant according to claim 3 having a recuperator in the circuit, one side of the heat transmitting surface of said recuperator having conduit means for introducing working medium from the first compressor and delivering it to the heater, the other side of said heat transmitting surface having conduit means for introducing working medium from the first turbine and delivering it to the cooler.

6. A plant according to claim 3 having conduit means for delivering the working fluid compressed by the second compressor into the cooler of the circuit.

7. A plant according to claim 3 in which the expansion turbine means comprise at least one turbine stage, the second compressor comprises a rotor, and the coupling device for transmitting work between said expansion turbine means and said second compressor consists in mounting said turbine stage on said rotor.

WALTER TRAUPEL.

REFERENCES CITED

The following references are of record in the file of this patent:

FOREIGN PATENTS

| Number | Country | Date |
|---|---|---|
| 378,229 | Italian | Jan. 25, 1940 |